United States Patent
Chopra et al.

(10) Patent No.: US 11,296,804 B2
(45) Date of Patent: Apr. 5, 2022

(54) RADIO-BASED CHANNEL SOUNDING USING PHASED ARRAY ANTENNAS

(71) Applicant: AT&T Intellectual Property I, L.P., Atlanta, GA (US)

(72) Inventors: Aditya Chopra, Austin, TX (US); Arunabha Ghosh, Austin, TX (US); Saeed Ghassemzadeh, Austin, TX (US); Salam Akoum, Austin, TX (US); Xiaoyi Wang, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 235 days.

(21) Appl. No.: 16/571,189

(22) Filed: Sep. 16, 2019

(65) Prior Publication Data

US 2020/0014475 A1 Jan. 9, 2020

Related U.S. Application Data

(63) Continuation of application No. 15/852,682, filed on Dec. 22, 2017, now Pat. No. 10,419,138.

(51) Int. Cl.
*H04B 17/309* (2015.01)
*H04B 7/08* (2006.01)
*H04B 17/318* (2015.01)
*H04W 52/42* (2009.01)
(Continued)

(52) U.S. Cl.
CPC .......... *H04B 17/309* (2015.01); *H04B 7/088* (2013.01); *H04B 17/318* (2015.01); *H04W 52/42* (2013.01); *H04B 7/0617* (2013.01); *H04W 88/08* (2013.01)

(58) Field of Classification Search
CPC ..... H04W 4/40; H04W 72/005; H04W 72/04; H04W 72/0406; H04L 45/74; H04L 45/745; H04L 69/22
See application file for complete search history.

(56) References Cited

U.S. PATENT DOCUMENTS

| 9,621,248 | B2 | 4/2017 | Maltsev et al. |
| 9,648,547 | B1 | 5/2017 | Hart et al. |
| 9,768,501 | B2 | 9/2017 | Maltsev et al. |

(Continued)

FOREIGN PATENT DOCUMENTS

WO 2017086922 A1 5/2017

*Primary Examiner* — Jenee Holland

(57) ABSTRACT

An example device may include at least three phased array antennas controllable to provide respective receive beams steerable in azimuth and elevation, where faces of the phased array antennas are arranged to provide a receive beam coverage 360 degrees in azimuth, and at least three radio frequency front ends to receive channel sounding waveforms from a fifth generation base station of a cellular network via the respective receive beams and to generate baseband signals from the channel sounding waveforms. The device may include a processing system including at least one processor in communication with the radio frequency front ends to steer the respective receive beams via instructions to the radio frequency front ends, receive the baseband signals from the radio frequency front ends, determine a plurality of measurements of at least one wireless channel parameter based upon the baseband signals, and record locations and spatial orientation information for the measurements.

20 Claims, 5 Drawing Sheets

(51) Int. Cl.
*H04B 7/06* (2006.01)
*H04W 88/08* (2009.01)

(56) References Cited

U.S. PATENT DOCUMENTS

| | | |
|---|---|---|
| 10,091,662 B1 | 10/2018 | Bendlin et al. |
| 10,244,408 B1 | 3/2019 | Vannucci et al. |
| 10,588,089 B1* | 3/2020 | Raghavan .............. H04W 52/42 |
| 2003/0090416 A1* | 5/2003 | Howell ................ H01Q 19/104 |
| | | 342/359 |
| 2006/0246863 A1* | 11/2006 | Reed ...................... H04B 7/088 |
| | | 455/276.1 |
| 2007/0224951 A1* | 9/2007 | Gilb ..................... H04B 7/0691 |
| | | 455/127.5 |
| 2013/0286960 A1 | 10/2013 | Li et al. |
| 2013/0301619 A1* | 11/2013 | Singh ................ H04W 56/0045 |
| | | 370/336 |
| 2013/0322280 A1* | 12/2013 | Pi ...................... H04W 56/0005 |
| | | 370/252 |
| 2014/0016573 A1 | 1/2014 | Nuggehalli et al. |
| 2014/0177607 A1 | 6/2014 | Li et al. |
| 2014/0200038 A1* | 7/2014 | Rao ........................ G01C 21/32 |
| | | 455/457 |
| 2014/0249827 A1 | 9/2014 | Sen et al. |
| 2014/0301492 A1 | 10/2014 | Xin et al. |
| 2015/0263424 A1* | 9/2015 | Sanford ............... H01Q 13/206 |
| | | 342/371 |
| 2015/0365143 A1* | 12/2015 | Chai .................... H04B 7/0452 |
| | | 455/101 |
| 2016/0065286 A1* | 3/2016 | Kim ..................... H04B 7/0617 |
| | | 370/330 |
| 2017/0195894 A1* | 7/2017 | Wen ...................... H04B 7/088 |
| 2017/0207545 A1 | 7/2017 | Miraftab et al. |
| 2017/0207547 A1 | 7/2017 | Zhai et al. |
| 2017/0237180 A1 | 8/2017 | Corman et al. |
| 2017/0317866 A1* | 11/2017 | Stirling-Gallacher ...................... H04B 7/0695 |
| 2017/0324459 A1* | 11/2017 | Koskela .............. H04B 7/0617 |
| 2017/0353338 A1 | 12/2017 | Amadjikpe et al. |
| 2017/0366242 A1* | 12/2017 | Lee ...................... H04B 7/0408 |
| 2018/0049150 A1* | 2/2018 | Chandwani ........... H04W 24/08 |
| 2018/0103468 A1 | 4/2018 | Li et al. |
| 2018/0131440 A1* | 5/2018 | Patel ....................... H02J 50/23 |
| 2018/0227775 A1 | 8/2018 | Bisiules et al. |
| 2018/0288557 A1 | 10/2018 | Najaf-Zadeh et al. |
| 2018/0302201 A1 | 10/2018 | Yoo et al. |
| 2018/0376505 A1* | 12/2018 | Zhang ............... H04W 74/0816 |
| 2019/0028159 A1* | 1/2019 | Bisiules ............... H01Q 25/005 |
| 2019/0089419 A1* | 3/2019 | Kim ..................... H01Q 1/325 |
| 2019/0116506 A1 | 4/2019 | Bendlin et al. |
| 2019/0158319 A1* | 5/2019 | Cezanne ............. H04L 25/0228 |
| 2019/0346860 A1* | 11/2019 | Houts ..................... G01S 11/04 |
| 2020/0166631 A1* | 5/2020 | Tong ..................... G01S 13/762 |

\* cited by examiner

RADIO-BASED CHANNEL SOUNDING USING PHASED ARRAY ANTENNAS

This application is a continuation of U.S. patent application Ser. No. 15/852,682, filed Dec. 22, 2017, now U.S. Pat. No. 10,419,138, which is herein incorporated by reference in its entirety.

The present disclosure relates generally to wireless communication networks, and more particularly to devices, non-transitory computer readable media, and methods for determining a plurality of measurements of at least one wireless channel parameter from channel sounding waveforms received from a fifth generation base station of a cellular network.

BACKGROUND

A wireless channel sounder is a device for measuring wireless channel related parameters such as complex impulse response, path loss, received signal strength (RSS), excess delay, or root-mean-square (RMS) delay spread, Doppler spread, fade rate, angle of arrival (AoA) and/or angle of departure (AoD), and the like, as experienced by a user equipment or base station. In one implementation, a wireless channel sounder may utilize a directional antenna. For instance, to measure AoA using a directional antenna, the antenna may be turned in incremental steps to measure the RSS. The AoA is recorded where the RSS is at a maximum. While this solution is inexpensive, it is a relatively slow measurement technique.

SUMMARY

In one example, the present disclosure discloses a device for determining a plurality of measurements of at least one wireless channel parameter from channel sounding waveforms received from a fifth generation base station of a cellular network. For example, a device may include at least three phased array antennas controllable to provide a respective receive beam that is steerable in azimuth and elevation, where faces of the at least three phased array antennas are arranged to provide a receive beam coverage 360 degrees in azimuth, and at least three radio frequency front ends coupled to the at least three phased antenna arrays. In one example, the at least three radio frequency front ends are to receive channel sounding waveforms from a fifth generation base station of a cellular network via the respective receive beams and generate baseband signals from the channel sounding waveforms. The device may further include a processing system including at least one processor in communication with the at least three radio frequency front ends to steer the respective receive beams via instructions to the at least three radio frequency front ends, receive the baseband signals from the at least three radio frequency front ends, determine a plurality of measurements of at least one wireless channel parameter based upon the baseband signals, and record locations and spatial orientation information for the plurality of measurements.

In another example, the present disclosure discloses a device, computer-readable medium, and method for determining a plurality of measurements of at least one wireless channel parameter from channel sounding waveforms received from a fifth generation base station of a cellular network. For example, a method may include a processing system having a processor steering respective receive beams of at least three phased array antennas, wherein faces of the at least three phased array antennas are arranged to provide a receive beam coverage 360 degrees in azimuth. The processing system may further receive baseband signals, the baseband signals generated from channel sounding waveforms received from the fifth generation base station of a cellular network via the respective receive beams of the at least three phased array antennas, determine a plurality of measurements of at least one wireless channel parameter based upon the baseband signals, and record locations and spatial orientation information for the plurality of measurements of the at least one wireless channel parameter.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

Figure 1:
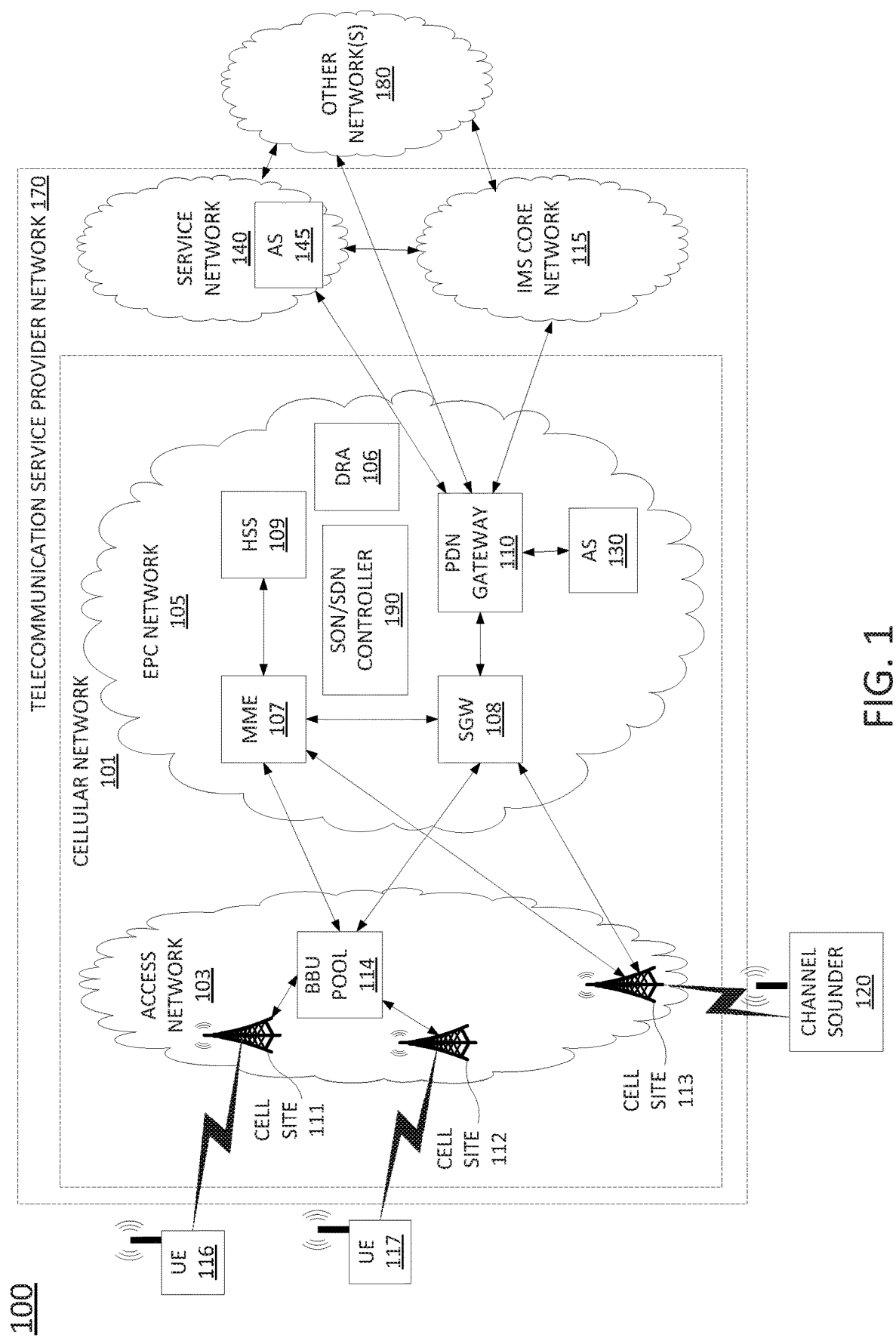
FIG. 1 illustrates a block diagram of an example system, in accordance with the present disclosure.

The present disclosure broadly discloses methods, computer-readable media, and devices for determining a plurality of measurements of at least one wireless channel parameter from channel sounding waveforms received from a fifth generation base station of a cellular network, e.g., a "new radio" or gNodeB (gNB). Developing 3GPP Fifth Generation (5G) standards include the use of millimeter wave frequencies (30 GHz to 300 GHz) as carrier frequencies. The propagation loss of air at such frequencies is relatively high. One technique to overcome this loss is the use of beamformed wireless communication. In beamformed communications, wireless signals are transmitted in a narrow beam. The concentration of energy in a narrow beam helps overcome the propagation loss of the wireless medium. Similarly, 5G receivers may also sense wireless signals in a narrow region of space, allowing the capture of a large amount of signal energy and correspondingly low amounts of noise and interference energy. This is relevant to channel sounding, as 5G channel models should provide metrics with respect to a spatial grid around the transmitter or the receiver.

Examples of the present disclosure provide a wireless channel sounding system (broadly a "receiver device") that includes multiple phased array antennas, where radio frequency (RF) components, such as power amplifiers, variable phase shifters, and transceivers are integrated with the antennas elements of each phased array. In particular, examples of the present disclosure provide a 5G capable receiver device to determine measurements of wireless channel parameters (e.g., one or more "key performance indicators" (KPIs)), such as a complex impulse response, a path loss, a received signal strength (RSS), e.g., a reference signal received power (RSRP), a carrier-to-interference (CIR) ratio (or signal-to-noise ratio (SNR)), an excess delay, a root-mean-square (RMS) delay spread, an angular spread, a Doppler spread, a fade rate, an angle of arrival (AoA), and the like, along with spatial orientation information, such as azimuth and elevation angles, and locations associated with the measurements.

The receiver device may comprise a user equipment (UE) or dedicated channel sounding device that is equipped to operate according to the specification of the considered wireless cellular communications standard (e.g., 5G millimeter wave multiple-in multiple-out (MIMO)). Notably, the receiver device may include at least three phased array antennas arranged to provide a receive beam coverage across 360 degrees in azimuth, and may be configured with the ability to simultaneously beam sweep multiple receive beams for the respective phased array antennas to receive channel sounding waveforms from the 5G base station transmitter and to determine measurements of wireless channel parameters based upon the channel sounding waveforms that are received. In other words, the at least three phased array antennas provide receive beams that are steerable so that for each azimuthal direction, at least one receive beam is steerable to include the azimuthal direction within the half-power beam width angular coverage of the at least one receive beam. Locations, or geographic positions may be determined at the receiver device via a Global Positioning System (GPS) receiver, or may be derived using other location estimation methods, such as cell identifier (cell ID) based methods, observed time difference of arrival (OTDA) techniques, or barycentric triangulation. The orientation of the receiver device may be determined from a gyroscope and compass, allowing the receiver device to determine a receive beam direction/spatial orientation, and to therefore measure wireless channel parameters with high spatial accuracy.

Antenna array geometry defines the placement of the antenna elements on the phased array antenna. For example, a uniform rectangular array (URA) geometry has antenna elements placed in a rectangular pattern with equal spacing between neighboring elements. Planar geometries such as the URA typically have a spatial region within which they can transmit or receive via a narrow beam (e.g., a half power beam width (HPBW) of less than 30 degrees angular spread, less than 15 degrees angular spread, less than 10 degrees angular spread, and so forth). In order to cover the entire 360 degree field of view in the azimuth plane around the receiver device, multiple planar phased array antennas may be arranged side-by-side. For instance, in one example, three planar phased array antennas may be arranged in a generally triangular layout. In another example, four planar phased array antennas may be arranged in a generally square or rectangular layout with each phased array antenna covering at least 90 degrees in azimuth. In such case, if the azimuth spatial coverage of each phased array antenna is greater than or equal to 90 degrees, the four phased array antennas can combine to cover all 360 degrees. Similarly, a configuration of three phased array antennas may cover the entire azimuth field of view as long as each phased array antenna has greater than or equal to 120 degrees of coverage. In another example, the present disclosure may utilize a cylindrical phased array antenna, with antenna elements placed either uniformly or non-uniformly on the face of the array. A complete cylinder with antenna elements on the surface can provide 360 degrees of azimuthal coverage. In another example, two half-cylinder phased array antennas can also provide similar coverage.

It should be noted that in various examples, the phased array antennas may have different fields-of-view in an elevation plane. For example, the phased array antennas may have a field of view in elevation of 120 degrees, 90 degrees, 60 degrees etc. The elevation field of view may be symmetric around the horizon (or a horizontal plane with respect to a device chassis) or may be offset, e.g., to provide greater coverage above or below a horizontal plane. For instance, the top edges of the phased array antennas may be angled towards each other, while the bottom edges of the phased array antennas may be angled away from each other. In another example, multiple phased array antennas may be arranged to provide 180 degrees of elevation coverage. For instance, an "upward" facing phased array antenna may be included in addition to the at least three phased array antennas arranged as described above. For example, a normal vector with respect to a plane of the upward facing phased array antenna may be perpendicular to normal vectors or the respective at least three phased array antennas.

In accordance with the present disclosure, appropriate control circuitry is paired with the phased array antennas. For example, if there are N phased array antennas, there are N independent receive beams that can be utilized simultaneously. In one example, the receiver device may include N radio frequency (RF) front ends (including, for example: variable phase shifters, power amplifiers, diplexers or switches, downconverters, and the like) and N digital baseband units (which may include transceivers) to sense the signals received via the respective N phased array antennas simultaneously. A receiver device with the ability to capture N beams at the same time can sweep through the 360 degree field of view quickly by dividing the total azimuth field of view into N smaller coverage zones for each of the receive beams of the N phased array antennas. In one example, the N signals coming out of the N phased array antennas can be fed into a single baseband receiver via a switch (or bank of switches). The switch(es) may be used to select one beam at any given time. In such an example, the receiver device may sweep the beams through their respective fields of view in a sequential manner, resulting in a slower sweep of the 360 degree field of view. By placing additional switches and baseband receivers, the number of baseband receivers can be set anywhere between 1 to N, in order to achieve a desired balance of cost, device size, performance speed, etc. In another example, each phased array antenna may be provided with its own dedicated RF front end.

In one example, wireless channel parameter measurements may be determined in digital baseband units. For instance, the digital baseband units may receive analog baseband signals from respective RF front ends and sample the analog baseband signals (e.g., an analog-to-digital conversion) to provide digital baseband signals. Each of the baseband receivers may be implemented as a programmable logic devices (PLD), such as a field programmable gate array (FPGA) or the like, processing units, such as a central processing unit (CPU) a multi-core processor, or the like in conjunction with a memory, and/or a combination of CPU-based processing unit(s) and PLD(s). The baseband processing units may thus perform various calculations to determine various measures of wireless channel parameters, such as a complex impulse response, a path loss, an RSS, a CIR, an excess delay, an RMS delay spread, an angular spread, a Doppler spread, a fade rate, an AoA, and so forth. Alternatively, or in addition, the digital baseband units may forward the digital baseband signals to a processor (or processors), such as a central processing unit (CPU) of the receiver device, to further determine various measurements of wireless channel parameters.

In accordance with the present disclosure, the receiver device tags a wireless channel parameter measurement with directional/spatial orientation information, i.e., in addition to a location. In one example, the receiver device may calculate a direction, or spatial orientation of a receive beam with respect to a local coordinate system, e.g., a three dimensional space with dimensions/axis aligned to a length, a width, and a depth of the receiver device, for example. In one example, a receiver device may include at least three phased array antennas that may be arranged to provide at least three receive beams and to steer each of the at least three receive beams through receive beam directions/spatial orientations within a given azimuth and elevation range. In addition, in one example, the receiver device may be configured to associate each receive beam (or receive beam direction/orientation) with a vector/direction/spatial orientation in a local coordinate system that is fixed, e.g., with respect to the positions of the at least three phased array antennas. For instance, the receiver device may be configured with a mapping of receive beams to spatial orientations/directions in the local coordinate system.

It should be noted that other local coordinate systems may have a different alignment with respect to the mobile endpoint device (e.g., offset 30 degrees from the major dimensions/axis of the mobile endpoint device). In any case, a local orientation of a receive beam in a local coordinate system may be translated into a global orientation, e.g., in the global coordinate system. In one example, the translations may be based upon the difference between the local orientation and the global orientation, which can be estimated using a gyroscope and compass of the mobile endpoint device. The determination of a direction/orientation of a receive beam and the translation to a spatial orientation in a global coordinate system are described in greater detail below in connection with the example of FIG. 2.

In yet another example, a receiver device may associate the angle of arrival (AoA) with a wireless channel parameter measurement (and a location), (e.g., where the wireless channel parameter measurement relates to a received power). In one example, the mobile endpoint device does not tag a wireless channel parameter measurement (e.g., received signal strength) with spatial orientation information, but rather tags spatial orientation information of a measurement with the location. For instance, at a given location, the primary direction from which the signal energy arrives is recorded, but not the actual received signal strength.

In one example, the receiver device may store a wireless channel parameter measurement in a record, along with the spatial orientation information and a location associated with the wireless channel parameter measurement, in a local memory until polled by the cellular network for transmission. In another example, the receiver device may indicate to the cellular network that it has one or more records of wireless channel parameter measurements ready for transmission to the cellular network. In one example, the cellular network may configure the receiver device to collect the wireless channel parameter measurements and associated spatial orientation information and locations. Alternatively, or in addition, the receiver device may indicate to the cellular network that it has records of wireless channel parameter measurements ready for transmission. For example, the receiver device may allocate a limited amount of memory and/or storage for the records of wireless channel parameter measurements. Accordingly, in one example the receiver device may indicate to the cellular network to poll the records of wireless channel parameter measurements before the allocated memory and/or storage capacity is reached.

In one example, the receiver device may time stamp the wireless channel parameter measurements. For instance, the receiver device may be configured to collect/tag wireless channel parameter measurements for K1 milliseconds every K2 seconds. In another example, a time stamp associated with a wireless channel parameter measurement may be implicit by the format in which the measurements are stored (e.g., sequentially in a database, where records in the database are associated with measurements taken at a given time interval). In another example, the receiver device may be configured to collect and tag wireless channel parameter measurements only after a condition has been met (e.g., the measurement falls above or below a predefined threshold or a relative threshold, such as a 20 percent drop in received signal strength as compared to an average received signal strength in a preceding time period).

In one example, one or more of the channel sounding waveforms from a 5G base station may comprise a broadcast signal. In accordance with the applicable cellular communication standards, "broadcast" means it is receivable by any 5G capable receiver device and is not user specific, but it may be transmitted either in an omnidirectional manner (e.g., over an entire a base station sector), or in a narrow beam that is swept by the base station with a sector. In one example, the broadcast signal comprises a synchronization signal from the 5G base station, such as a primary synchronization signal (PSS), a secondary synchronization signal (SSS), a physical broadcast channel (PBCH), and/or a downlink modulation reference signal (DMRS) contained within a synchronization signaling (SS) block.

In one example, one or more of the channel sounding waveforms from the 5G base station may comprise a signal on a control channel or a data channel, such as a physical downlink shared channel (PDSCH), a reference signal (RS), or multiple reference signals, such as a channel station information reference signal CSI-RS, and so forth. In one example, each of the channel sounding waveforms comprises at least one time/frequency resource block of a time and frequency resource grid of the cellular base station. For instance, the at least one time/frequency resource block may comprise a PDSCH. In such an example, for each of the channel sounding waveforms, a modulation coding scheme of the PDSCH may set at least to one of: a binary phase shift keying (BPSK) modulation coding scheme, a quadrature phase shift keying (QPSK) modulation coding scheme, a modulation coding scheme based upon a precoding matrix indicator, or a modulation coding scheme based upon precoder cycling. Higher level encoding schemes such as 16-QAM, 64-QAM, and the like may also be used in other examples. In another example, the at least one time/frequency resource block comprises at least one time/frequency resource block of the time and frequency resource grid that is reserved for forward compatibility or for legacy system usage. In one example, each of the channel sounding waveforms may comprises at least one of a predetermined bit sequence included in a payload of a media access control (MAC) protocol data unit (PDU), a predetermined bit sequence included in a payload of a radio link control PDU, or a predetermined bit sequence included in a payload of a packet data convergence PDU.

In one example, the receiver device may determine measurements of wireless channel parameters from channel sounding waveforms related to initial access procedures (e.g., PSS, SSS, a PBCH, and/or a downlink modulation reference signal (DMRS) contained within a synchronization signaling (SS) block). In addition, in one example, the receiver device may not perform measurements relating to reception/transmission of control and data channels. Such an arrangement may enable basic coverage determination/optimization at a significantly lower overhead and power consumption than a receiver device implementing a full radio access protocol (e.g., a 5G NR access protocol). For instance, the receiver device may collect and tag wireless channel parameter measurements without utilizing uplink transmission capabilities, except to report the records to the cellular network periodically or on demand. In other words, the receiver device may collect wireless channel parameter measurements, locations, and spatial orientation information while not connected to the network (e.g., in a radio resource control (RRC) idle (RRC_IDLE) mode). In this case, a wireless channel parameter measurement configuration of the receiver device may be preconfigured/preloaded, or provided by dedicated signaling via another radio access technology (e.g., LTE).

In such an example, the receiver device may collect wireless channel parameter measurements in a RRC idle (RRC_IDLE) mode and upon reconnection to the cellular network (e.g., an RRC_CONNECTED mode), the receiver device may signal to the cellular network the availability of records of wireless channel parameter measurements. In one example, the cellular network may indicate to the receiver device to report only a subset of the records of wireless channel parameter measurements (e.g., for measurements taken during an indicated time period or over a given duration, for measurements taken on one or more specific carriers, for measurements of one or more specified measurement types and/or wireless channel parameters, and so forth). In addition, the cellular network may configure the receiver device to start or stop collecting wireless channel parameter measurements (and to start and stop location information and spatial orientation information tagging of such measurements).

The measurements of the at least one wireless channel parameter that may be determined from the channel sounding waveforms may include: a complex impulse response, a path loss, an RSS, a CIR, an excess delay, an RMS delay spread, an angular spread, a Doppler spread, a fade rate, or an AoA. Alternatively, or in addition, the measurements of least one wireless channel parameter may include an occurrence of beam failure event, a radio link interruption event, or a random access procedure failure event. For example, a beam recovery procedure may entail the transmission of a beam failure indication from the receiver device to the cellular network to trigger a transmission beam switch procedure in order to avoid entering a radio link failure (RLF) condition at the mobile endpoint device. In one example, the mobile endpoint device may log the beam failure and/or corresponding beam recovery attempts at the mobile endpoint device along with location(s) and spatial orientation information. In another example, the receiver device may log radio link interruption (RLI) event along with associated location information and spatial orientation information regarding a receive beam direction.

In one example, the receiver device may determine SS block RSRP and/or channel state information (CSI)-RSRP measurements, e.g., as part of beam management (BM) and/or beam recovery (BR) procedures in accordance with a cellular communication protocol employed by the cellular network and implemented at the base station and the mobile endpoint device (e.g., 5G). In one example, the receiver device tags a SS block RSRP and/or CSI-RSRP measurement with a location tag and spatial orientation information. For instance, the location may be added to a record for the wireless channel parameter measurement. The wireless channel parameter measurements may be layer 1 (L1) or layer 3 (L3) filtered, beam-specific or cell-specific, and different combinations of measurement types may be collected and tagged by the receiver device with location information and spatial orientation information. In yet another example, the receiver device may be configured to record events related to random access channel (RACH) procedures, including location(s) and spatial orientation information, and report to the cellular network. The RACH event recording may also include a time stamp and other relevant parameters, such as a duration of a RACH failure event, RACH resources selected by the mobile endpoint device (e.g., preamble format, number of repetitions, time/frequency resources, etc.), transmission power, and transmit/receive (Tx/Rx) beamforming utilized at the receiver device.

It should be noted that examples of the present disclosure are applicable to a receiver device which operate in a 5G standalone (SA) or non-standalone (NSA) "new radio" (NR) mode. In an example involving NSA mode, the receiver device may be configured with a master node (MN) which is a 4G/Long Term Evolution (LTE) eNB and a secondary node (SN) which is a 5G new radio gNB. In such an example, the receiver device may be configured to determine wireless channel parameter measurements and to provide location and spatial orientation information tagging on one of more NR carriers by the MN via LTE RRC signaling. In addition, the records for such wireless channel parameter measurements obtained with respect to the NR carrier(s) may be provided by the receiver device to the cellular network utilizing LTE signaling to the MN. For instance, LTE higher layer signaling (e.g., at the radio resource control (RRC) layer) may be utilized to control/configure the receiver device and to report wireless channel parameter measurements along with associated location information and spatial orientation information back to the cellular network. Notably, using the LTE air interface for the control signaling may increase the range of the wireless channel parameter measurements beyond what would be possible if it was solely operating in millimeter wave spectrum using NR technology. In another example, the configuration for the wireless channel parameter measurement collection and tagging, and/or the configuration for subsequent reporting to the cellular network may be performed via dedicated signaling to the SN. In still another example, the receiver device may collect and tag wireless channel parameter measurements on NR carriers of activated SN cells (e.g., during an ongoing NR data session) or may be configured or instructed to collect and tag wireless channel parameter measurements on NR carriers when one or more SN cells are deactivated, or as part of an inter-frequency measurement configuration including the NR carriers.

Although examples of the present disclosure are applicable to a wide range of frequency bands, in one example, the present disclosure may relate to centimeter and millimeter wave systems. For instance, for all of the examples herein, the considered wireless cellular communications standard can be the Third Generation Project (3GPP) New Radio (NR) and/or 5G radio access technology. For the examples herein, the base station can be a gNB or gNodeB or base station of a 5G-RAN (5G radio access network). It should be noted that for illustrative purposes, various base station systems are described herein in connection with particular quantities or values. However, base station systems of the present disclosure may include different quantities of various components, and/or operating parameters which may have any number of different values. For instance, a base station system may have a different number transmit antennas, may have antennas with different beamwidths, may utilize different frequencies, may utilize different transmit powers, and so forth. In addition, a base station system may include a different number of antenna sector units covering a same or a different range in azimuth and/or elevation, may have sectors with different coverages, may have a different number of antenna elements per sector, may have a different desired SNRs, may utilize a fewer number of samples per antenna for a different averaging gain, and so forth. These and other aspects of the present disclosure are discussed in greater detail below in connection with the examples of FIGS. 1-5.

To better understand the present disclosure, FIG. 1 illustrates an example network, or system 100 in which examples of the present disclosure for determining a plurality of measurements of at least one wireless channel parameter from channel sounding waveforms received from a 5G base station of a cellular network may operate. In one example, the system 100 includes a telecommunication service provider network 170. The telecommunication service provider network 170 may comprise a cellular network 101 (e.g., a 4G/Long Term Evolution (LTE) network, a 4G/5G hybrid network, or the like), a service network 140, and a core network, e.g., an IP Multimedia Subsystem (IMS) core network 115. The system 100 may further include other networks 180 connected to the telecommunication service provider network 170. FIG. 1 also illustrates various mobile endpoint devices, e.g., user equipment (UE) 116 and 117. The UE 116 and 117 may each comprise a cellular telephone, a smartphone, a tablet computing device, a laptop computer, a pair of computing glasses, a wireless enabled wristwatch, or any other cellular-capable mobile telephony and computing devices (broadly, "a mobile endpoint device").

In one example, the cellular network 101 comprises an access network 103 and a core network, Evolved Packet Core (EPC) network 105. In one example, the access network 103 comprises a cloud RAN. For instance, a cloud RAN is part of the 3rd Generation Partnership Project (3GPP) 5G specifications for mobile networks. As part of the migration of cellular networks towards 5G, a cloud RAN may be coupled to an EPC network until new cellular core networks are deployed in accordance with 5G specifications. In one example, access network 103 may include cell sites 111 and 112 and a baseband unit (BBU) pool 114. In a cloud RAN, radio frequency (RF) components, referred to as remote radio heads (RRHs), may be deployed remotely from baseband units, e.g., atop cell site masts, buildings, and so forth. In one example, the BBU pool 114 may be located at distances as far as 20-80 kilometers or more away from the antennas/remote radio heads of cell sites 111 and 112 that are serviced by the BBU pool 114. It should also be noted that in accordance with efforts to migrate to 5G networks, cell sites may be deployed with new antenna and radio infrastructures such as multiple input multiple output (MIMO) antennas, and millimeter wave antennas. In this regard, a cell, e.g., the footprint or coverage area of a cell site, may in some instances be smaller than the coverage provided by NodeBs or eNodeBs of 3G-4G RAN infrastructure. For example, the coverage of a cell site utilizing one or more millimeter wave antennas may be 1000 feet or less.

Although cloud RAN infrastructure may include distributed RRHs and centralized baseband units, a heterogeneous network may include cell sites where RRH and BBU components remain co-located at the cell site. For instance, cell site 113 may include RRH and BBU components. Thus, cell site 113 may comprise a self-contained "base station." With regard to cell sites 111 and 112, the "base stations" may comprise RRHs at cell sites 111 and 112 coupled with respective baseband units of BBU pool 114.

In accordance with the present disclosure, any one or more of cell sites 111-113 may be deployed with antenna and radio infrastructures, including multiple input multiple output (MIMO) and millimeter wave antennas. In one example, any one or more of cell sites 111-113 may comprise one or more directional antennas (e.g., capable of providing a half-power azimuthal beamwidth of 60 degrees or less, 30 degrees or less, 15 degrees or less, etc.) that are used to transmit channel sounding waveforms in accordance with the present disclosure.

Furthermore, in accordance with the present disclosure, a base station (e.g., cell sites 111-113 and/or baseband units within BBU pool 114) may comprise all or a portion of a computing device or system, such as computing system 500, and/or processing system 502 as described in connection with FIG. 5 below, and may be configured to provide one or more functions in connection with examples of the present disclosure for determining a plurality of measurements of at least one wireless channel parameter from channel sounding waveforms received from a 5G base station of a cellular network, and for performing various other operations in accordance with the present disclosure. For instance, cell site 113 may receive a notification of a presence of channel sounder 120, may transmit to or receive from the channel sounder 120 test channel sounding waveforms and/or characterization parameters, including timing information, signal bandwidth, signal power, sub-carrier identification, and the like, may transmit the channel sounding waveforms via the "channel" for which the plurality of measurements of the least one wireless channel parameter are to be determined, and so forth.

In one example, the channel sounder 120 may be used to determine the plurality of measurements of the least one wireless channel parameter (broadly, "channel sounding"). In one example, channel sounder 120 may comprise a user equipment, e.g., a mobile endpoint device comprising a cellular telephone, a smartphone, a tablet computing device, a laptop computer, or any other cellular-capable mobile telephony and computing devices (broadly, a "receiver device"). In one example, channel sounder 120 may comprise a dedicated channel sounding device.

In one example, the channel sounder 120 may be used to receive channel sounding waveforms that are transmitted in an environment, where the channel sounding waveforms, as received, may be used to calculate or determine the measures of various wireless channel parameters such as: a complex impulse response, a path loss, an RSS, a CIR, an excess delay, an RMS delay spread, an angular spread, a Doppler spread, a fade rate, an AoA, and so forth. In one example, the channel sounder 120 includes a plurality of phased array antennas that may be activated and deactivated according to a schedule or otherwise synchronized to the transmission of channel sounding waveforms. In one example, each phased array antenna may be paired with an RF front end to receive radio frequency (RF) signals from the respective phased array antenna and convert the signals into baseband signals. A digital sampling unit (e.g., an analog-to-digital converter (ADC) of a baseband processing unit) may convert the baseband signals into digital representations of the channel sounding waveforms that are received via the respective phased array antennas. For instance, the digital sampling units may oversample the analog baseband signals at a sampling interval under the control of timing signals from a clock circuit to create the digital representations of the channel sounding waveforms.

In one example, the baseband processing units may output the digital representations of the channel sounding waveforms to a processor unit that is configured to perform various operations for determining measures of wireless channel parameters, as described herein. For instance, the channel sounder 120 may calculate, based upon the digital representations of the channel sounding waveforms, a phase difference between channel sounding waveforms received via respective antennas. The processor unit may further determine an angle of arrival (AoA) based upon the antenna positions and the phase difference. In one example, the channel sounder 120 may receive a reference copy or copies of the channel sounding waveforms(s) and/or a set of parameters characterizing the channel sounding waveforms, from the transmitter (e.g., cell site 113). Accordingly, the channel sounder 120 may determine a carrier-to-interference ratio (CIR) by comparing a sequence received via one of the phased array antennas with a reference copy. Similarly, the channel sounder 120 may calculate a complex impulse response, a path loss, an RSS, a CIR, an excess delay, an RMS delay spread, an angular spread, a Doppler spread, a fade rate, an AoA, or the like, from the digital representations of the channel sounding waveforms.

In one example, the channel sounder 120 may perform further functions, including communicating with a transmitter-side device (e.g., cell site 113) to coordinate the timing of the transmission of the channel sounding waveforms with activations and deactivations of the phased array antennas and/or the steering of receive beams in particular receive beam directions, to receive reference copies of channel sounding waveforms that are transmitted, and so forth. For instance, the channel sounder 120 may maintain a communication link, such as via control signaling communications or an out-of band wireless link (e.g., using a different set of antennas and a different RF communication band than the antenna sector units that are used for channel sounding/channel property measurements in accordance with the present disclosure) to communicate with cell site 113.

In one example, the channel sounder 120 may comprise all or a portion of a computing device or system, such as computing system 500, and/or processing system 502 as described in connection with FIG. 5 below, and may be configured to provide one or more functions for determining a plurality of measurements of at least one wireless channel parameter from channel sounding waveforms received from a 5G base station of a cellular network, and for performing various other operations in accordance with the present disclosure. For instance, channel sounder 120 may be configured to perform functions such as those described below in connection with the example method 400 of FIG. 4.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 5 and discussed below) or multiple computing devices collectively configured to perform various steps, functions, and/or operations in accordance with the present disclosure. For instance, channel sounder 120 may receive test copies or characterization parameters of channel sounding waveforms from cell site 113, may measure channel properties in accordance with the test copies or characterization parameters, and may transmit the measured channel properties to cell site 113. For example, cell site 113 or another component of telecommunication network 170 may then aggregate channel property measures, and may determine locations and/or orientations for deployment of customer premises equipment, e.g., for fixed wireless broadband (FWB), or the like, based upon the channel property measures, and so forth.

In one example, the EPC network 105 provides various functions that support wireless services in the LTE environment. In one example, EPC network 105 is an Internet Protocol (IP) packet core network that supports both real-time and non-real-time service delivery across a LTE network, e.g., as specified by the 3GPP standards. In one example, cell sites 111 and 112 in the access network 103 are in communication with the EPC network 105 via baseband units in BBU pool 114. In operation, UE 116 may access wireless services via the cell site 111 and UE 117 may access wireless services via the cell site 112 located in the access network 103. It should be noted that any number of cell sites can be deployed in access network. In one illustrative example, the access network 103 may comprise one or more cell sites.

In EPC network 105, network devices such as Mobility Management Entity (MME) 107 and Serving Gateway (SGW) 108 support various functions as part of the cellular network 101. For example, MME 107 is the control node for the LTE access network. In one embodiment, MME 107 is responsible for UE (User Equipment) tracking and paging (e.g., such as retransmissions), bearer activation and deactivation process, selection of the SGW, and authentication of a user. In one embodiment, SGW 108 routes and forwards user data packets, while also acting as the mobility anchor for the user plane during inter-cell handovers and as the anchor for mobility between 5G, LTE and other wireless technologies, such as 2G and 3G wireless networks.

In addition, EPC network 105 may comprise a Home Subscriber Server (HSS) 109 that contains subscription-related information (e.g., subscriber profiles), performs authentication and authorization of a wireless service user, and provides information about the subscriber's location. The EPC network 105 may also comprise a packet data network (PDN) gateway 110 which serves as a gateway that provides access between the EPC network 105 and various data networks, e.g., service network 140, IMS core network 115, other network(s) 180, and the like. The packet data network gateway 110 is also referred to as a PDN gateway, a PDN GW or a PGW. In addition, the EPC network 105 may include a Diameter routing agent (DRA) 106, which may be engaged in the proper routing of messages between other elements within EPC network 105, and with other components of the system 100, such as a call session control function (CSCF) (not shown) in IMS core network 115. For clarity, the connections between DRA 106 and other components of EPC network 105 are omitted from the illustration of FIG. 1.

In one example, service network 140 may comprise one or more devices, such as application server (AS) 145 for providing services to subscribers, customers, and or users. For example, telecommunication service provider network 170 may provide a cloud storage service, web server hosting, and other services. As such, service network 140 may represent aspects of telecommunication service provider network 170 where infrastructure for supporting such services may be deployed. In one example, AS 145 may comprise all or a portion of a computing device or system, such as computing system 500, and/or processing system 502 as described in connection with FIG. 5 below, specifically configured to provide one or more service functions in accordance with the present disclosure, such as a network-based secure data storage for wireless channel parameter measurement records. For instance, cell site 113 may collect measurements of wireless channel parameters from channel sounder 120 and may forward the measurements of wireless channel parameters to AS 145 for storage. Although a single application server, AS 145, is illustrated in service network 140, it should be understood that service network 140 may include any number of components to support one or more services that may be provided to one or more subscribers, customers, or users by the telecommunication service provider network 170.

In one example, other networks 180 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 180 may include different types of networks. In another example, the other networks 180 may be the same type of network. In one example, the other networks 180 may represent the Internet in general.

In accordance with the present disclosure, any one or more of the components of EPC network 105 may comprise network function virtualization infrastructure (NFVI), e.g., SDN host devices (i.e., physical devices) configured to operate as various virtual network functions (VNFs), such as a virtual MME (vMME), a virtual HHS (vHSS), a virtual serving gateway (vSGW), a virtual packet data network gateway (vPGW), and so forth. For instance, MME 107 may comprise a vMME, SGW 108 may comprise a vSGW, and so forth. In this regard, the EPC network 105 may be expanded (or contracted) to include more or less components than the state of EPC network 105 that is illustrated in FIG. 1. In this regard, the EPC network 105 may also include a self-optimizing network (SON)/software defined network (SDN) controller 190.

In one example, SON/SDN controller 190 may function as a self-optimizing network (SON) orchestrator that is responsible for activating and deactivating, allocating and deallocating, and otherwise managing a variety of network components. For instance, SON/SDN controller 190 may activate and deactivate antennas/remote radio heads of cell sites 111 and 112, respectively, may allocate and deactivate baseband units in BBU pool 114, and may perform other operations for activating antennas based upon a location and a movement of a mobile endpoint device or a group of mobile endpoint devices, in accordance with the present disclosure.

In one example, SON/SDN controller 190 may further comprise a SDN controller that is responsible for instantiating, configuring, managing, and releasing VNFs. For example, in a SDN architecture, a SDN controller may instantiate VNFs on shared hardware, e.g., NFVI/host devices/SDN nodes, which may be physically located in various places. In one example, the configuring, releasing, and reconfiguring of SDN nodes is controlled by the SDN controller, which may store configuration codes, e.g., computer/processor-executable programs, instructions, or the like for various functions which can be loaded onto an SDN node. In another example, the SDN controller may instruct, or request an SDN node to retrieve appropriate configuration codes from a network-based repository, e.g., a storage device, to relieve the SDN controller from having to store and transfer configuration codes for various functions to the SDN nodes.

In one example, SON/SDN controller 190 may comprise all or a portion of a computing device or system, such as computing system 500, and/or processing system 502 as described in connection with FIG. 5 below, and may be configured to provide one or more functions in connection with examples of the present disclosure for determining a plurality of measurements of at least one wireless channel parameter from channel sounding waveforms received from a 5G base station of a cellular network, and for performing various other operations in accordance with the present disclosure. For example, SON/SDN controller 190 may ensure that a cell site 111-113 and/or baseband unit of BBU pool 114 is provisioned with configuration code which, when executed by a processing system of the respective component(s), cause various operations in connection with examples of the present disclosure for determining a plurality of measurements of at least one wireless channel parameter from channel sounding waveforms received from a 5G base station of a cellular network to be performed. For instance, SON/SDN controller 190 may store such configuration code and provision the code to the respective component(s), or may direct the respective component(s) to obtain the configuration code from another repository.

Accordingly, the SON/SDN controller 190 may be connected directly or indirectly to any one or more network elements of EPC network 105, and of the system 100 in general. Due to the relatively large number of connections available between SON/SDN controller 190 and other network elements, none of the actual links to the application server are shown in FIG. 1. Similarly, intermediate devices and links between DRA 106, MME 107, SGW 108, cell sites 111 and 112, PDN gateway 110, and other components of system 100 are also omitted for clarity, such as additional routers, switches, gateways, and the like.

As further illustrated in FIG. 1, EPC network 105 may further include an application server (AS) 130, which may comprise all or a portion of a computing device or system, such as computing system 500, and/or processing system 502 as described in connection with FIG. 5 below, and may be configured to perform various operations in connection with examples of the present disclosure for determining a plurality of measurements of at least one wireless channel parameter from channel sounding waveforms received from a 5G base station of a cellular network, and for performing various other operations in accordance with the present disclosure. For instance, AS 130 may select channel sounding waveforms to be used for wireless channel parameter measurements, may provide the channel sounding waveforms to base stations for transmission, may provide test copies and/or characterization parameters of channel sounding waveforms to channel sounding receivers, such as channel sounder 120, and so forth. In this regard, AS 130 may maintain communications with BBU pool 114, cell sites 111-113, channel sounder 120, and so forth, via PDN gateway 110 and SGW 108, for example. AS 130 may also receive wireless channel parameter measurements from channel sounding receivers via respective base stations, and may perform other operations based upon the wireless channel parameter measurements that are received. For instance, AS 130 may select a location and/or orientation of a customer premises equipment (CPE), based upon the wireless channel parameter measurements. For example, channel sounding via cell site 113 and channel sounder 120 may be performed at several candidate locations for a CPE, and a location (and/or orientation) with the highest carrier-to-interference ratio (CIR), may be selected. In one example, AS 130 may collect and store wireless channel parameter measurements locally, e.g., in an internal or attached storage device, or remotely, e.g., in a cloud based data storage infrastructure, or the like. For instance, AS 130 may store the wireless channel parameter measurements in AS 145 of service network 140, may retrieve the channel property measurements to calculate a preferred CPE location and/or orientation, or to perform other operations in accordance with the present disclosure.

The foregoing description of the system 100 is provided as an illustrative example only. In other words, the example of system 100 is merely illustrative of one network configuration that is suitable for implementing embodiments of the present disclosure. As such, other logical and/or physical arrangements for the system 100 may be implemented in accordance with the present disclosure. For example, the system 100 may be expanded to include additional networks, such as network operations center (NOC) networks, additional access networks, and so forth. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For instance, in one example, SON/SDN controller 190 may be spilt into separate components to operate as a SON orchestrator and a SDN controller, respectively. Similarly, although the SON/SDN controller 190 is illustrated as a component of EPC network 105, in another example SON/SDN controller 190, and/or other network components may be deployed in an IMS core network 115 instead of being deployed within the EPC network 105, or in other portions of system 100 that are not shown, while providing essentially the same functionality. Similarly, functions described herein with respect to AS 130 may alternatively or additional be provided by AS 145.

In addition, although aspects of the present disclosure have been discussed above in the context of a long term evolution (LTE)-based core network (e.g., EPC network 105), examples of the present disclosure are not so limited. For example, as illustrated in FIG. 1, the cellular network 101 may represent a "non-stand alone" (NSA) mode architecture where 5G radio access network components, such as a "new radio" (NR), "gNodeB" (or "gNB"), and so forth are supported by a 4G/LTE core network (e.g., a Evolved Packet Core (EPC) network 105). However, in another example, system 100 may instead comprise a 5G "standalone" (SA) mode point-to-point or service-based architecture where components and functions of EPC network 105 are replaced by a 5G core network, which may include an access and mobility management function (AMF), a user plane function (UPF), a session management function (SMF), a policy control function (PCF), a unified data management function (UDM), an authentication server function (AUSF), an application function (AF), a network repository function (NRF), and so on. For instance, in such a network, application server (AS) 130 of FIG. 1 may represent an application function (AF) for adjusting aspects of a cellular network in response to measurements of wireless channel parameters by a receiver device, and for performing various other operations in accordance with the present disclosure. In addition, any one or more of cell sites 111-113 may comprise 2G, 3G, 4G and/or LTE radios, e.g., in addition to 5G new radio (NR) functionality. For instance, in non-standalone (NSA) mode architecture, LTE radio equipment may continue to be used for cell signaling and management communications, while user data may rely upon a 5G new radio (NR), including millimeter wave communications, for example. Thus, these and other modifications are all contemplated within the scope of the present disclosure.

Figure 2:
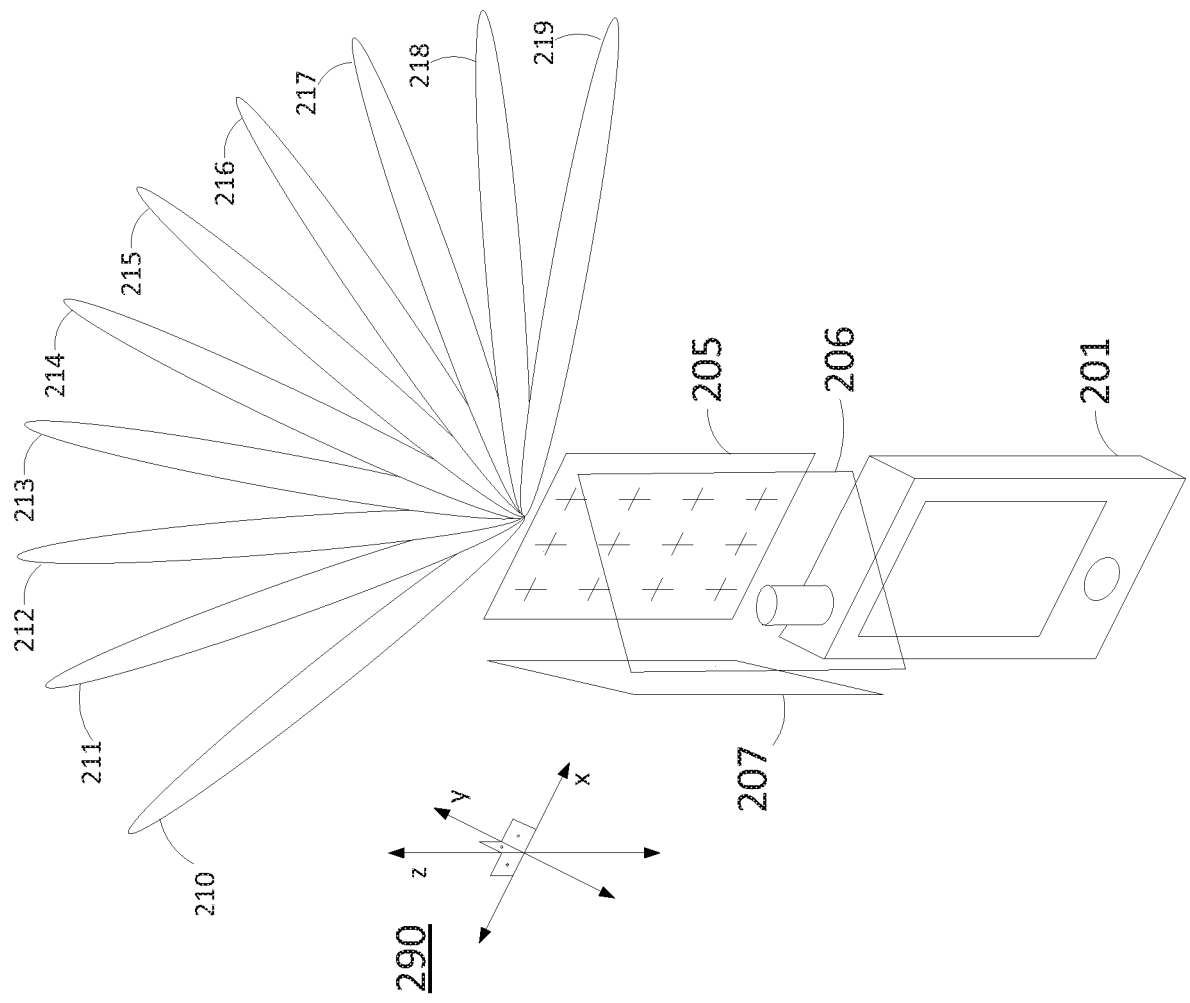
FIG. 2 illustrates an example translation of spatial orientation information of a local coordinate system with respect to a mobile endpoint device into spatial orientation information in a global coordinate system, in accordance with the present disclosure.
Figure 2:
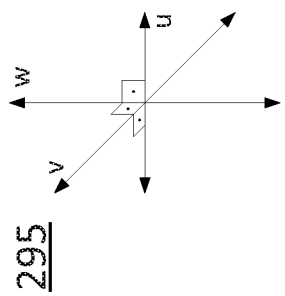

FIG. 2 illustrates an example translation of spatial orientation information of a local coordinate system with respect to phased array antennas into a global coordinate system. In particular, FIG. 2 illustrates an environment 200 containing a receiver device 201 with at least three phased array antennas 205-207. It should be noted that the example of FIG. 2 is provided for illustrative purposes in connection with just one illustrative architecture comprising a plurality of phased array antennas. Thus, the following discussion is equally applicable to other arrangements of phased array antennas, such as four phased array antennas in a rectangular or square layout, a cylindrical phased array antenna, and so forth.

As illustrated in FIG. 2, the orientation of phased array antennas 205-207 is shown with respect to local coordinate system 290 containing axis (x, y, z). A global coordinate system 295 having a different orientation and containing axis (u, v, w) is also illustrated in FIG. 2. The receiver device 201 may be configured to receive multi-path and/or spatial diversity signals, e.g., via receive beam directions 210-219 of phased array antenna 205. Each of the receive beam directions 210-219 may have different azimuth and elevation bearings from the other receive beam directions of receive beam directions 210-219. In one example, signals from receive beam directions 210-219 may be identified by receive beam indexes/indices or logical beam identifiers (beam IDs).

In one example, the receiver device 201 can identify a wireless signal on a receive beam that is oriented in one of the receive beam directions 210-219 via voltage(s) and phase(s) in the receiver circuitry associated with one or more given antenna elements of the phased array antenna 205, or via a logical index associated with a respective receive beam direction 210-219. The receiver device 201 may also translate each of the receive beam directions 210-219 to a set of angles (or angles and magnitudes), n-tuples of coordinates defining a unit vector (or defining a magnitude and direction/orientation), or any other definitive units of local coordinate system 290, thereby giving the receive beam directions 210-219, identified with a logical "beam ID," a physical spatial direction/orientation with respect to the local coordinate system 290. A similar procedure may be applied to receive beams (and receive beam directions) associated with phased array antennas 206 and 207.

In one example, the local coordinate system 290 may be mapped or translated to the global coordinate system 295. For instance, global coordinate system 295 may have two dimensions corresponding to a planar estimation of the surface of the Earth (e.g., the "u" axis and "v" axis in FIG. 2), with the third dimension (e.g., the "w" axis) being normal to the plane. In addition, the planar estimation of the surface of the Earth can also be aligned such that one dimension is north-south (e.g., the "v" axis) and another dimension is east-west (e.g., the "u" axis). Accordingly, the orientations of the (x, y, z) axis of local coordinate system 290 relative to the (u, v, w) axis of global coordinate system 295 may be determined from a gyroscope and compass of the receiver device 201. The receive beam directions 210-219 may be similarly translated into directions/orientations in the global coordinate system 295 via the same mapping.

In one example, a location of receiver device 201 in local coordinate system 290 may be translated into a location in global coordinate system 295. For instance, receiver device 201 may estimate its position relative to several base stations/cell sites using observed time difference of arrival (OTDA). Once receiver device 201 determines its location relative to these base stations/cell sites, the receiver device 201 may then determine an absolute location (e.g., a latitude and a longitude) from the location relative to fixed known locations of the base stations/cell sites. However, in another example, the receiver device 201 may include a GPS receiver such that receiver device 201 may determine an absolute location (e.g., in global coordinate system 295) which may comprise a standard latitude and longitude.

For a given location in the local coordinate system 290 corresponding to a location in the global coordinate system 295, the receiver device 201 may collect a set of measurements of one or more wireless channel parameters. For instance, for each spatial direction/receive beam direction 210-219, or for a subset of the receive beam directions 210-219, the receiver device 201 may perform a series of predefined or configurable measurements. For example, for each spatial direction/receive beam direction 210-219 the receiver device 201 may set the phase and/or the voltage driving each antenna element of phased array antenna 205 according to a look up table where each entry corresponds to a receive beam index, receive a waveform (a channel sounding waveform) via the receive beam pointed in a corresponding one of the receive beam directions 210-219, and calculate or determine the measures of various wireless channel parameters such as: a complex impulse response, a path loss, an RSS, a CIR, an excess delay, an RMS delay spread, an angular spread, a Doppler spread, a fade rate, an AoA, and so forth based upon the waveform that is received. In other words, for the given location the receiver device 201 will sample the space according to the receive beam directions 210-219 (as well as other receive beam directions) in the look-up table. Furthermore, each wireless channel parameter measurement may be associated with a position and orientation of the receiver device 201. It should be noted that a similar procedure may be applied to receive beams associated with phased array antennas 206 and 207 to collect a set of measurements of one or more wireless channel parameters for 360 degrees in azimuth and a given range in elevation (with respect to the orientation of the receiver device 201). For instance, the receive beam of phased array antenna 205 may be steerable over at least 120 degrees in azimuth. In addition, the receive beam of phased array antenna 205 may be steerable over a range in elevation (e.g., local coordinate system 290), such as 90 degrees in elevation, 120 degrees in elevation, etc.

Figure 3:
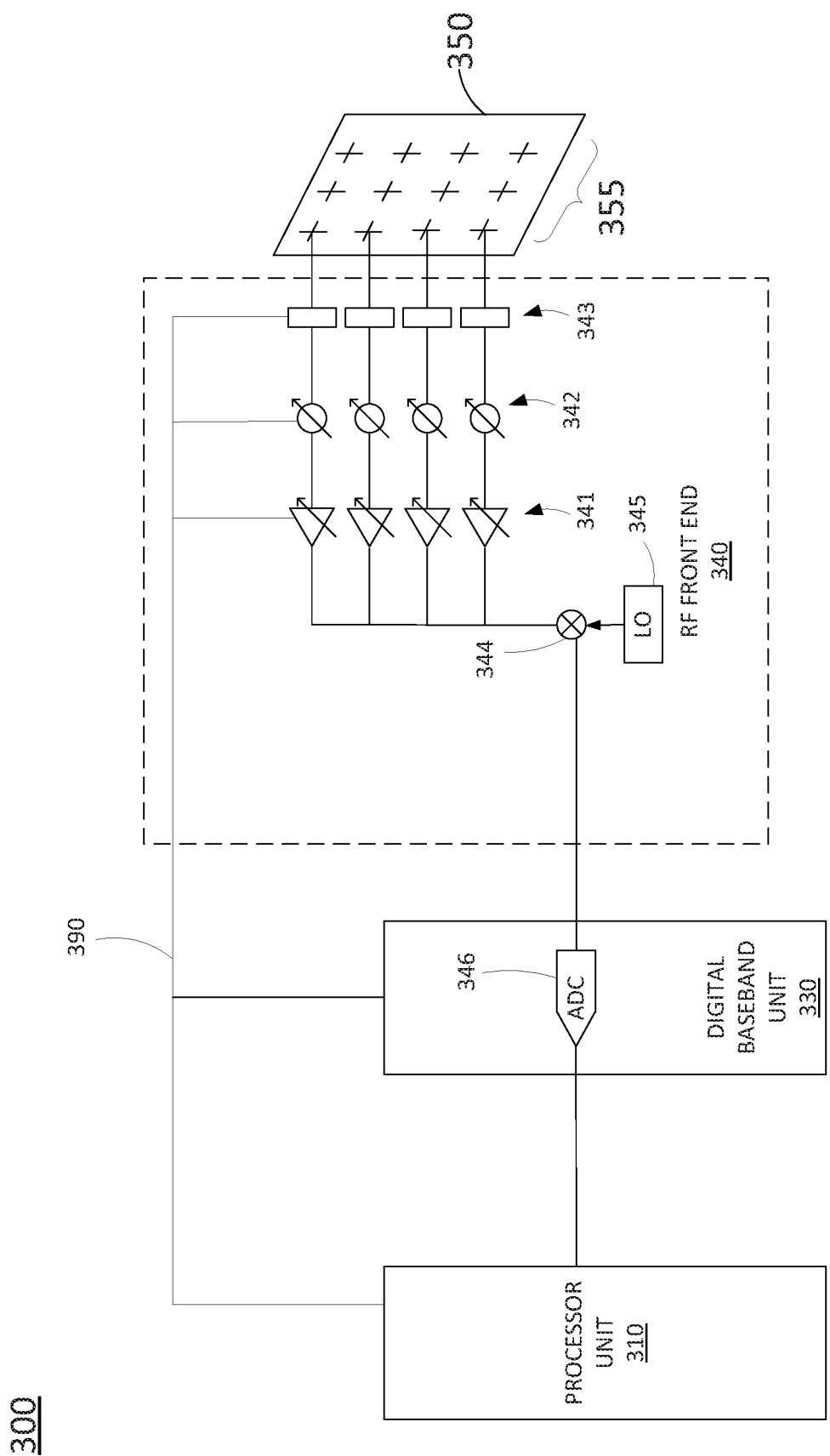
FIG. 3 illustrates a portion of a receiver device for determining a plurality of measurements of at least one wireless channel parameter from channel sounding waveforms received from a fifth generation base station of a cellular network.

FIG. 3 illustrates a portion of an example receiver device 300, in accordance with the present disclosure. As illustrated in FIG. 3, receiver device 300 includes a phased array antenna 350 having a plurality of antenna elements 355. The phased array antenna 350 may be coupled to a radio frequency (RF) front end 340. RF front end 340 may comprise a circuit between the phased array antenna 350 and a digital baseband unit 330 (e.g., a 5G radio receiver, or transceiver). In the example of FIG. 3, the RF front end 340 includes a plurality of filters 343, a plurality of variable phase shifters 342, and a plurality of variable gain amplifiers 341. RF front end 340 may further include a RF-to-baseband downconverter 344 that is controlled by local oscillator (LO) 345 and which may down-convert received signals to a baseband frequency range. The RF-to-baseband downconverter 344 feeds received and down-converted signals (e.g., analog baseband signals) to an analog-to-digital converter (ADC) 346 of digital baseband unit 330. ADC 346 may sample the analog baseband signals to output digital baseband signals. For instance, ADC 346 may oversample the analog baseband signals at a sampling interval under the control of timing signals from a clock circuit (e.g., including a rubidium reference clock or the like) to create the digital representations of the channel sounding waveforms that are received.

The digital baseband unit 330 may output the digital representations of the channel sounding waveforms to a processor unit 310 that is configured to perform various operations for determining measurements of wireless channel parameters, as described herein. For instance, the processor unit 310 may calculate, based upon the digital representations of the channel sounding waveforms, various measurements of wireless channel parameters, such as: a complex impulse response, a path loss, an RSS, a CIR, an excess delay, an RMS delay spread, an angular spread, a Doppler spread, a fade rate, an AoA, and so forth. In one example, the processor unit 310 may receive a reference copy or copies of the channel sounding waveform(s), from a 5G base station transmitter. Accordingly, the processor unit 310 may determine a complex impulse response, a path loss, an RSS, a CIR, an excess delay, an RMS delay spread, an angular spread, a Doppler spread, a fade rate, an AoA, and so forth by comparing the digital representation of the channel sounding waveform sequence received via phased array antenna 350 with a reference copy. In one example, the processor unit 310 may comprise all or a portion of a computing device or system, such as system 500, and/or processor 502 as described in connection with FIG. 5 below.

In one example, the processor unit 310 may perform further functions, such as communicating with the 5G base station transmitter to receive reference copies of channel sounding waveforms or characterization parameters of the channel sounding waveform(s) that are transmitted. The characterization parameters may include: a transmit power, a waveform/sequence indication, timing indication (e.g., transmission duration, periodicity, offset, and the like), frequency location (e.g. sub-band index, grid alignment, transmission bandwidth), and so forth. As just one example, a primary synchronization signal (PSS) of a synchronization signaling (SS) block is extended in frequency to create a wideband signal without changing the narrowband part of the PSS which a UE would expect (e.g., if the UE is operating according to 5G or similar wireless communications standard that specifies a narrowband PSS). These parameters may be provided by higher layer signaling (e.g., at the radio resource control (RRC) layer), via pre-configuration, or at the application layer.

In one example, the processor unit 310 may communicate with the 5G base station transmitter to coordinate the timing of the transmission of the channel sounding waveforms. For instance, some of the channel sounding waveforms may comprise broadcast signals and/or reference signals that are transmitted regardless of the presence of processor unit 310. However, other channel sounding waveforms may be transmitted on a physical downlink shared channel (PDSCH), in a blank resource of a time and frequency resource grid of the 5G base station transmitter, and so forth. Accordingly, in one example, a processor unit 310 may request "on-demand" transmission of channel sounding waveforms. Thus, the network may conserve resources and mitigate potential sources of interference for other user data by avoiding transmission of the channel sounding waveform/sequences unless receiver device 300, or another channel sounding receiver device, is present and actively taking measurements.

In one example, processor unit 310 may adjust the gain(s) of variable gain amplifiers 341 and/or the phase delays of variable phase shifters 342 via control lines 390. In one example, the pass band of filters 343 may also be controlled via control lines 390. The control of these elements of RF front end 340 may be based upon the various criteria, including the known or expected bit sequences of the channel sounding waveform(s) and/or other characterization parameters of the channel sounding waveform(s). In one example, the processor unit 310 may also configure digital baseband unit 330 and/or ADC 346 to function in a particular manner, e.g., based upon the characterization parameters and the expected characteristics of the channel sounding waveform(s) that are received.

In one example, certain measurements of wireless channel parameters may be determined in digital baseband unit 330, e.g., as an alternative or in addition to determining measurements of wireless channel parameters by processor unit 310. For instance, digital baseband unit 330 may comprise a programmable logic devices (PLD), such as a field programmable gate array (FPGA), or the like. Accordingly, in one example, the digital baseband unit 330 may be configured to determine measurements of one or more wireless channel parameters. In such an example, the digital baseband unit 330 may forward measurements of one or more wireless channel parameters to processor unit 310, e.g., for further tagging with location and/or spatial orientation information.

It should also be noted that FIG. 3 illustrates one receive path of device 300 that includes phased array antenna 350. However, device 300 may include a plurality of additional phased array antennas, RF front ends, and digital baseband units coupled to processor unit 310 that are the same or substantially similar to the portion of device 300 illustrated in FIG. 3. Thus, processor unit 310 may also control aspects of other RF front ends to steer receive beams via respective phased array antennas, to digitally sample baseband downconverted signals based upon the characterization of the channel sounding waveform(s), and so forth.

It should also be noted that the example of FIG. 3 provides just one example of a receive path of a receiver device in accordance with the present disclosure. For example, another receiver device may be utilized that includes a different RF front end. In another example, ADC 346 may be included in RF front end 340, e.g., instead of in digital baseband unit 330. In still another example, the filters 343 may comprise diplexers which may be configured and reconfigured for transmit and receive modes, respectively. In one example, the antenna elements 355 may comprise dual polarization antenna elements. However, for ease of illustration, the portion of device 300 depicted in FIG. 3 may be related to one of the polarizations. Thus, these and other modifications are all contemplated within the scope of the present disclosure.

Figure 4:
FIG. 4 illustrates a flowchart of an example method for determining a plurality of measurements of at least one wireless channel parameter from channel sounding waveforms received from a fifth generation base station of a cellular network.

FIG. 4 illustrates a flowchart of an example method 400 for determining a plurality of measurements of at least one wireless channel parameter from channel sounding waveforms received from a 5G base station of a cellular network, in accordance with the present disclosure. In one example, steps, functions and/or operations of the method 400 may be performed by a device as illustrated in FIG. 1, e.g., a receiver device, or any one or more components thereof, such as a processing system, a Global Positioning System (GPS) unit, a phased array antenna, and so forth. In accordance with the present disclosure a processing system may include one or more processors, which can include CPUs, PLDs, or a combination thereof. For instance, a processing system may include processor unit 310 and/or digital baseband unit 330 of the receiver device 300 of FIG. 3. In one example, the steps, functions, or operations of method 400 may be performed by a computing device or system 500, and/or a processing system 502 as described in connection with FIG. 5 below. For instance, the computing device 500 may represent at least a portion of a receiver device in accordance with the present disclosure. For illustrative purposes, the method 400 is described in greater detail below in connection with an example performed by a processing system. The method 400 begins in step 405 and may proceed to optional step 410, optional step 420, or to step 430.

At step 410, the processing system (e.g., of a receiver device) steers respective receive beams of at least three phased array antennas via instructions to at least three radio frequency (RF) front ends that are coupled to the at least three phased array antennas. In one example, each of the at least three phased antenna arrays is controllable to provide a respective receive beam that is steerable in azimuth and elevation. In addition, in one example, faces of the at least three phased array antennas are arranged to cover (e.g., to provide receive beam coverage) over 360 degrees in azimuth. For instance, with three phased array antennas, each of the phased array antennas may provide receive beam coverage over at least a 120 degree azimuthal sector. With four phased array antennas, each of the phased array antennas may provide receive beam coverage over at least a 90 degree azimuthal sector, and so forth.

In one example, each of the at least three RF front ends includes a plurality of variable phase shifters associated with respective antenna elements of an associated one of the at least three phased array antennas. In one example, each of the at least three RF front ends includes a plurality of variable gain amplifiers associated with respective antenna elements of an associated one of the at least three phased array antennas. In one example, the instructions to the at least three RF front ends to steer the respective receive beams are for controlling the plurality of variable phase shifters (and/or the variable gain amplifiers) to control the directions (spatial orientations) of the respective receive beams.

In accordance with the present disclosure, each of the respective receive beams may comprise a directional beam with a half-power beamwidth (HPBW) of less than 30 degrees (e.g., less than or equal to 15 degrees, less than or equal to 10 degrees, etc.). In addition, in one example, the steering the respective beams at step 410 may further include controlling the HPBW of the each of the respective beams via the instructions.

At step 420, the processing system receives the baseband signals from the at least three RF front ends. For example, the at least three RF front ends may be coupled to the at least three phased antenna arrays to receive channel sounding waveforms from a 5G base station of a cellular network via the respective receive beams and to generate the baseband signals from the channel sounding waveforms that are received. For instance, each of the at least three RF front ends may include an RF-to-baseband down-converter. The 5G base station may comprise a gNodeB, gNB, or "new radio." In one example, the baseband signals may comprise digital baseband signals. In another example, the processing system may receive analog baseband signals and converts the analog baseband signals to digital baseband signals (e.g., via an ADC).

The channel sounding waveforms may comprise, for example, broadcast signals from the 5G base station. In one example a broadcast signal is a signal that is receivable by any UE (and/or receiver device) and is not user specific. In one example, the broadcast signals may be transmitted over an entire coverage area of a base station (e.g., across 360 degrees in azimuth) or over an entire base station sector (e.g., across 120 degrees for a three-sector base station). In another example, the broadcast signal may be transmitted on a narrow beam that is swept by the base station, and is not simultaneously broadcast 360 degrees or 120 degrees across an entire sector). In one example, the broadcast signal may comprise a synchronization signal from the 5G base station, such as a primary synchronization signal (PSS), a secondary synchronization signal (SSS), a physical broadcast channel (PBCH), and/or a downlink modulation reference signal (DMRS)) contained within a synchronization signaling (SS) block). In one example, the at least one wireless signal may comprise a reference signal (RS), or multiple reference signals, as an alternative or in addition to the SS-block, such as a channel station information reference signal CSI-RS.

In one example, the channel sounding waveforms are transmitted via a directional antenna, e.g., a phased array antenna for beamforming. Thus, each of the channel sounding waveforms may be associated with a particular transmit beam or transmit beam direction (in azimuth and elevation). In one example, the channel sounding waveforms may comprise successive synchronization signals or reference signals over multiple bursts via the same or different transmit beams, and so forth.

In one example, each of the channel sounding waveforms comprises at least one time/frequency resource block of a time and frequency resource grid of the 5G base station. For instance, in one example, the at least one time/frequency resource block comprises at least one time/frequency resource block of the time and frequency resource grid that is reserved for forward compatibility or for legacy system usage. In one example, the at least one time/frequency resource block may comprise a physical downlink shared channel (PDSCH). In such an example, for each of the channel sounding waveforms, a modulation coding scheme (MCS) of the PDSCH may be set at least to one of: a binary phase shift keying (BPSK) MCS, a quadrature phase shift keying (QPSK) MCS, a MCS based upon a precoding matrix indicator (PMI), or a MCS based upon precoder cycling. In one example, each of the channel sounding waveforms may comprise at least one of a predetermined bit sequence included in a payload of a media access control (MAC) protocol data unit (PDU), a predetermined bit sequence included in a payload of a radio link control (RLC) PDU, or a predetermined bit sequence included in a payload of a packet data convergence (PDC) PDU.

It should be noted that in one example, the steering of the respective receive beams at step 410 and the receiving of the baseband signals from the at least three RF front ends may be performed simultaneously with regard to the at least three phased array antennas and the associated at least three RF front ends. For instance, at least three measurements may be taken at the same time for at least three different receive beam directions provided via the respective phased array antennas and RF front ends.

At step 430, the processing system determines a plurality of measurements of at least one wireless channel parameter based upon the baseband signals (e.g., digital representations of the channel sounding waveforms). For instance, each of the plurality of measurements of the at least one wireless channel parameter may be associated with a respective one of the baseband signals that is generated from respective one of the channel sounding waveforms. In one example, the at one wireless channel parameter may comprise one or more of: a complex impulse response, a path loss, a received signal strength (RSS), e.g., a reference signal received power (RSRP), a carrier-to-interference (CIR) ratio (or signal-to-noise ratio (SNR)), an excess delay, an RMS delay spread, an angular spread, a Doppler spread, a fade rate, an angle of arrival (AoA), and so forth. In one example, the at least one wireless channel parameter may further comprise one or more of: a beam failure event, a radio link interruption event, a random access procedure failure event, or the like.

In one example, the processing system may perform synchronization signaling (SS) block reference signal received power (RSRP) and/or channel state information (CSI)-RSRP measurements, e.g., as part of beam management (BM) and/or beam recovery (BR) procedures in accordance with a 5G cellular communication protocol employed by the cellular network. In one example, the processing system may receive a reference copy or copies of the channel sounding waveform(s) and/or characterization parameters of the channel sounding waveform(s), e.g., from the 5G base station. Accordingly, in one example, the determining of the plurality of measurements of the at least one wireless channel parameter may be based upon a comparison or correlation of the reference copy (or copies) or the characterization parameters, to digital baseband signals (e.g., digital representations of the channel sounding waveforms that are received).

At step 440, the processing system determines locations of the plurality of measurements via a global positioning system (GPS) of the receiver device, or may be derived using other location estimation methods, such as cell identifier (cell ID) based methods, observed time difference of arrival (OTDA) techniques, or barycentric triangulation. In one example, the locations may comprise latitude and longitude coordinates.

At step 450, the processing system determines a spatial orientation for each of the plurality of measurements of the at least one wireless channel parameter. For example, the spatial orientation information may comprise, for each the plurality of measurements of the at least one wireless channel parameter, a direction of one of the respective receive beams. In one example, the processing system may calculate a direction/spatial orientation of a receive beam (e.g., a receive beam on which a channel sounding waveform is received) with respect to a local coordinate system of the receiver device. For example, the processing system may associate each receive beam (or receive beam direction/spatial orientation) with a vector/direction/spatial orientation in a local coordinate system that is fixed, e.g., with respect to the receiver device chassis. In addition, in one example, the processing system may translate the spatial orientation of the receive beam from a local coordinate system to a spatial orientation in a global coordinate system e.g., azimuth angles indicated with respect to 360 degrees, with 0/360 being north, magnetic north, or other reference standards, and elevation angles with respect to the horizon of the Earth. In one example, the translations may be based upon the difference between the local orientation and the global orientation, which can be estimated using a gyroscope and compass of the receiver device.

At step 460, the processing system records locations and spatial orientation information for the measurements of the at least one wireless channel parameter. For example, the locations and spatial orientation information may be determined at steps 440 and 450 described above and recorded along with the respective measurements of the at least one wireless channel parameter.

At step 470, the processing system records a time stamp associated with each of the measurements of the at least one wireless channel parameter. For instance, the receiver device may be configured to collect/tag wireless channel parameter measurements for K1 milliseconds every K2 seconds. In another example, a time stamp associated with a wireless channel parameter measurement may be implicit by the format in which the measurements are stored (e.g., sequentially in a database, where records in the database are associated with measurements taken at a given time interval).

At step 480, the processing system transmits to the cellular network the measurements of the at least one wireless channel parameter, the locations, and the spatial orientation information. In one example, the processing system may further transmit time stamps associated with each of the measurements of the at least one wireless channel parameter. In one example, the 5G base station operates using a first type of radio access architecture (e.g., 5G new radio (NR)) and the transmitting at step 480 may comprise transmitting to a component of the cellular network that utilizes a second type of radio access architecture that is different from the first type of radio access architecture. For instance, the base station may comprise a gNodeB, and the transmitting at step 480 may comprise transmitting to an eNodeB of the cellular network.

In one example, at least one aspect of the cellular network may be automatically adjusted in response to the measurement of the wireless channel parameter, the location, and the spatial orientation information. For example, the adjusting the at least one aspect of the cellular network may include: activating a remote radio head, activating a baseband unit, deactivating a remote radio head, deactivating a baseband unit, changing a transmit power of a base station, changing a boresight direction of an antenna array (including adjusting tilt and azimuth bearing), changing a beamwidth of a gain pattern of an antenna array, changing a channel coding scheme availability at a base station, changing a base station backhaul configuration, and so forth. Following step 480, the method 400 proceeds to step 495 where the method ends.

It should be noted that the method 400 may be expanded to include additional steps or may be modified to include additional operations with respect to the steps outlined above. For example, the method 400 may be repeated through various cycles of wireless channel parameter measurements, various cycles of adjustments to a cellular network, and so forth. For instance, a receiver device may continue to move throughout an environment, determine measurements of wireless channel parameters, locations, and spatial orientation information, report back to the cellular network, and so on. In one example, the method 400 may include receiving an instruction from the 5G base station regarding the collecting of measurement(s) of wireless channel parameter(s) with respect to one or more wireless signals. For instance, the cellular network may configure the receiver device to start and stop collecting the wireless channel parameter measurements (along with spatial orientation information and locations associated with the wireless channel parameter measurements), to collect the wireless channel parameter measurements (along with spatial orientation information and locations associated with the wireless channel parameter measurements) while the receiver device is not connected to the cellular network, to collect a subset of wireless channel parameter measurements that the receiver device is capable of collecting (along with spatial orientation information and locations associated with the wireless channel parameter measurements), to report a subset of the wireless channel parameter measurement records that the receiver device has collected, to utilize a particular location determination technique, and so on. In one example, the method 400 may further include the processing system transmitting a notification to the 5G base station that the receiver device is present and available to collect wireless channel parameter measurements. In one example, the notification may include information regarding the collecting and reporting capabilities of the receiver device.

In addition, although not specifically specified, one or more steps, functions, or operations of the method 400 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 4 that recite a determining operation or involve a decision do not necessarily require that both branches of the determining operation be practiced. In other words, one of the branches of the determining operation can be deemed as an optional step. Furthermore, steps, blocks, functions or operations of the above described method(s) can be combined, separated, and/or performed in a different order from that described above, without departing from the example examples of the present disclosure.

Figure 5:
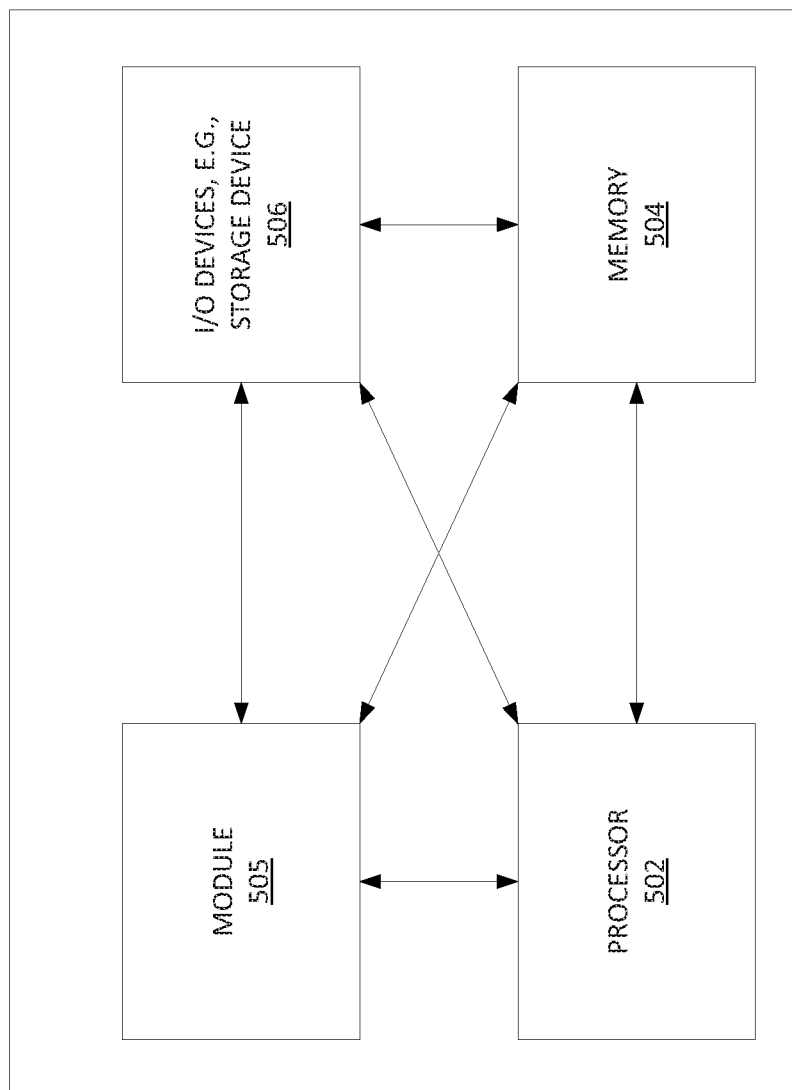
FIG. 5 illustrates an example of a computing device, or computing system, specifically programmed to perform the steps, functions, blocks, and/or operations described herein.

FIG. 5 depicts a high-level block diagram of a computing device or processing system specifically programmed to perform the functions described herein. As depicted in FIG. 5, the processing system 500 comprises one or more hardware processor elements 502 (e.g., a central processing unit (CPU), a microprocessor, or a multi-core processor), a memory 504 (e.g., random access memory (RAM) and/or read only memory (ROM)), a module 505 for determining a plurality of measurements of at least one wireless channel parameter from channel sounding waveforms received from a fifth generation base station of a cellular network, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)).

In accordance with the present disclosure input/output devices 506 may also include antenna elements, antenna arrays, remote radio heads (RRHs), baseband units (BBUs), transceivers, power units, and so forth. Although only one processor element is shown, it should be noted that the computing device may employ a plurality of processor elements. Furthermore, although only one computing device is shown in the figure, if the method 400 as discussed above is implemented in a distributed or parallel manner for a particular illustrative example, i.e., the steps of the above method 400, or the entire method 400, is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 502 can also be configured or programmed to cause other devices to perform one or more operations as discussed above. In other words, the hardware processor 502 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 400 In one example, instructions and data for the present module or process 505 for determining a plurality of measurements of at least one wireless channel parameter from channel sounding waveforms received from a fifth generation base station of a cellular network (e.g., a software program comprising computer-executable instructions) can be loaded into memory 504 and executed by hardware processor element 502 to implement the steps, functions, or operations as discussed above in connection with the illustrative method 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 505 for determining a plurality of measurements of at least one wireless channel parameter from channel sounding waveforms received from a fifth generation base station of a cellular network (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A device comprising:
a pair of phased array antennas, wherein each antenna of the pair of phased array antennas is controllable to provide a respective receive beam that is steerable in azimuth and elevation, wherein each antenna of the pair of phased array antennas comprises a half-cylinder phased array antenna, wherein faces of each antenna of the pair of phased array antennas are arranged to provide a receive beam coverage over 360 degrees in azimuth;
a pair of radio frequency front ends coupled to the pair of phased antenna arrays to:
receive channel sounding waveforms from a fifth generation base station of a cellular network via the respective receive beams; and
generate baseband signals from the channel sounding waveforms received from the fifth generation base station; and
a processing system including at least one processor in communication with the pair of radio frequency front ends to:
steer the respective receive beams via instructions to the pair of radio frequency front ends;
receive the baseband signals from the pair of radio frequency front ends;
determine a plurality of measurements of at least one wireless channel parameter based upon the baseband signals; and
record locations and spatial orientation information for the plurality of measurements of the at least one wireless channel parameter.

2. The device of claim 1, wherein each antenna of the pair of phased array antennas provides the receive beam coverage over at least a 120 degree azimuthal sector.

3. The device of claim 1, wherein each radio frequency front end of the pair of radio frequency front ends includes a plurality of variable phase shifters associated with respective antenna elements of an associated antenna of the pair of phased array antennas.

4. The device of claim 3, wherein the instructions to the pair of radio frequency front ends to steer the respective receive beams are for controlling the plurality of variable phase shifters to control the directions of the respective receive beams.

5. The device of claim 1, wherein each of the respective receive beams comprises a directional beam with a half-power beamwidth of less than 30 degrees, wherein the steering the respective receive beams further comprises controlling the half-power beamwidth of the each of the respective receive beams via the instructions.

6. The device of claim 1, wherein each radio frequency front end of the pair of radio frequency front ends includes a radio frequency-to-baseband downconverter.

7. The device of claim 1, further comprising:
a global positioning system, wherein the processing system is further to determine the locations via the global positioning system.

8. The device of claim 1, wherein the spatial orientation information comprises, for each the plurality of measurements of the at least one wireless channel parameter, a direction of one of the respective receive beams.

9. The device of claim 1, further comprising:
a gyroscope; and
a compass, wherein the processing system is further to determine the spatial orientation information via the gyroscope and the compass.

10. The device of claim 1, wherein each of the channel sounding waveforms comprises a broadcast signal from the fifth generation base station.

11. The device of claim 1, wherein the at least one wireless channel parameter comprises at least one of:
a complex impulse response;
a path loss;
a received signal strength;
a carrier-to-interference ratio;
an excess delay;
a root-mean-square delay spread;
an angular spread;
a doppler spread;
a fade rate; or
an angle of arrival.

12. The device of claim 1, wherein each of the channel sounding waveforms comprises at least one time/frequency resource block of a time and frequency resource grid of the fifth generation base station.

13. A device comprising:
a processing system including at least one processor; and
a computer-readable medium storing instructions which, when executed by the processing system, cause the processing system to perform operations, the operations comprising:
steering respective receive beams of a pair of phased array antennas, wherein each antenna of the pair of phased array antennas comprises a half-cylinder phased array antenna, wherein faces of each antenna of the pair of phased array antennas are arranged to provide a receive beam coverage 360 degrees in azimuth;
receiving baseband signals, wherein the baseband signals are generated from channel sounding waveforms received from a fifth generation base station of a cellular network via the respective receive beams of the pair of phased array antennas;
determining a plurality of measurements of at least one wireless channel parameter based upon the baseband signals; and
recording locations and spatial orientation information for the plurality of measurements of the at least one wireless channel parameter.

14. The device of claim 13, wherein the steering comprises:
transmitting instructions to a pair of radio frequency front ends associated with the pair of phased array antennas.

15. The device of claim 14, wherein the baseband signals are received from the pair of radio frequency front ends.

16. The device of claim 15, wherein the pair of radio frequency front ends are to:
receive the channel sounding waveforms from the fifth generation base station of the cellular network via the respective receive beams; and
generate the baseband signals from the channel sounding waveforms received from the fifth generation base station.

17. The device of claim 13, wherein the operations further comprise:
transmitting to the cellular network the plurality of measurements of the at least one wireless channel parameter, the locations, and the spatial orientation information.

18. The device of claim 13, wherein the operations further comprise:
recording a time stamp associated with each of the plurality of measurements of the at least one wireless channel parameter.

19. A method comprising:
steering, by a processing system including at least one processor, respective receive beams of a pair of phased array antennas, wherein each antenna of the pair of phased array antennas comprises a half-cylinder phased array antenna, wherein faces of each antenna of the pair of phased array antennas are arranged to provide a receive beam coverage 360 degrees in azimuth;
receiving, by the processing system, baseband signals, wherein the baseband signals are generated from channel sounding waveforms received from a fifth generation base station of a cellular network via the respective receive beams of the pair of phased array antennas;
determining, by the processing system, a plurality of measurements of at least one wireless channel parameter based upon the baseband signals; and
recording, by the processing system, locations and spatial orientation information for the plurality of measurements of the at least one wireless channel parameter.

20. The method of claim 19, further comprising:
transmitting to the cellular network the plurality of measurements of the at least one wireless channel parameter, the locations, and the spatial orientation information.

* * * * *